United States Patent
Malischewski

(10) Patent No.: US 11,732,660 B2
(45) Date of Patent: Aug. 22, 2023

(54) METHOD FOR OPERATING AN INTERNAL COMBUSTION ENGINE

(71) Applicant: MAN Truck & Bus SE, Munich (DE)

(72) Inventor: Thomas Malischewski, Heilsbronn (DE)

(73) Assignee: MAN TRUCK & BUS SE, Munich (DE)

(*) Notice: Subject to any disclaimer, the term of this patent is extended or adjusted under 35 U.S.C. 154(b) by 0 days.

(21) Appl. No.: 17/273,083

(22) PCT Filed: Sep. 6, 2019

(86) PCT No.: PCT/EP2019/073794
§ 371 (c)(1),
(2) Date: Mar. 3, 2021

(87) PCT Pub. No.: WO2020/053081
PCT Pub. Date: Mar. 19, 2020

(65) Prior Publication Data
US 2021/0189979 A1    Jun. 24, 2021

(30) Foreign Application Priority Data

Sep. 13, 2018  (DE) .................... 10 2018 122 342.0

(51) Int. Cl.
*F02D 41/00*  (2006.01)
*F02D 13/02*  (2006.01)
*F02M 26/05*  (2016.01)

(52) U.S. Cl.
CPC ..... *F02D 41/0002* (2013.01); *F02D 13/0207* (2013.01); *F02D 13/0261* (2013.01);
(Continued)

(58) Field of Classification Search
CPC ............ F02D 41/0002; F02D 13/0207; F02D 13/0261; F02D 13/0273; F02D 2041/001;
(Continued)

(56) References Cited

U.S. PATENT DOCUMENTS

| | | | | |
|---|---|---|---|---|
| 2,717,583 A | * | 9/1955 | Maybach | ............ F02D 13/0226 123/363 |
| 3,808,807 A | * | 5/1974 | Lanpheer | ................ F02B 29/00 60/314 |

(Continued)

FOREIGN PATENT DOCUMENTS

| | | |
|---|---|---|
| AT | 005783 U1 | 11/2002 |
| CN | 101858261 A | 10/2010 |

(Continued)

OTHER PUBLICATIONS

German Search Report issued in DE 102018122342.0 dated May 22, 2019. No English translation available.

(Continued)

*Primary Examiner* — Sizo B Vilakazi
*Assistant Examiner* — Brian R Kirby
(74) *Attorney, Agent, or Firm* — Weber Rosselli & Cannon LLP

(57) ABSTRACT

The present disclosure relates to a method for operating an internal combustion engine (IO). The method includes generating a pressure pulse in an exhaust gas system of the internal combustion engine (IO). The method also includes supplying exhaust gas from a combustion chamber of a cylinder during an exhaust outlet stroke of the cylinder into an inlet channel of the cylinder by propagating the pressure pulse from the exhaust gas system into the combustion chamber of the cylinder. The method further includes supplying the exhaust gas from the inlet channel of the cylinder into the combustion chamber of the cylinder during an (Continued)

intake stroke of the cylinder. By means of internal residual gas control (residual exhaust gas control), the method permits the exhaust gas temperature to be raised in at low load without negatively influencing the full load performance of the internal combustion engine (IO).

19 Claims, 2 Drawing Sheets

(52) U.S. Cl.
 CPC .... *F02D 13/0273* (2013.01); *F02D 2041/001* (2013.01); *F02D 2200/0802* (2013.01); *F02M 26/05* (2016.02)

(58) Field of Classification Search
 CPC ..... F02D 2200/0802; F02D 2013/0292; F02D 41/0255; F02D 41/006; F02M 26/05; Y02T 10/40; Y02T 10/12
 USPC .......................................................... 123/348
 See application file for complete search history.

(56) References Cited

U.S. PATENT DOCUMENTS

| | | | | | |
|---|---|---|---|---|---|
| 4,722,315 | A | * | 2/1988 | Pickel | F02D 41/006 123/90.11 |
| 4,765,137 | A | * | 8/1988 | Sakurai | F02B 75/20 60/313 |
| 5,226,401 | A | * | 7/1993 | Clarke | F02M 26/41 123/90.11 |
| 6,325,043 | B1 | * | 12/2001 | Meistrick | F01L 1/181 123/321 |
| 6,397,802 | B1 | * | 6/2002 | Rutschmann | F01L 1/0532 123/90.6 |
| 6,439,210 | B1 | * | 8/2002 | Faletti | F02D 13/0207 123/568.14 |
| 6,772,742 | B2 | * | 8/2004 | Lei | F02D 41/006 60/602 |
| 6,827,067 | B1 | * | 12/2004 | Yang | F02D 13/0273 123/568.14 |
| 6,932,063 | B1 | | 8/2005 | Hu | |
| 7,249,597 | B2 | * | 7/2007 | Muller | F02D 13/0207 123/568.14 |
| 7,506,624 | B2 | * | 3/2009 | Deane | F01L 13/06 123/90.6 |
| 7,753,037 | B2 | * | 7/2010 | Hatamura | F01N 13/011 123/58.8 |
| 7,819,101 | B2 | * | 10/2010 | Poola | F02D 13/0226 123/90.6 |
| 8,468,800 | B2 | * | 6/2013 | Hatamura | F01N 3/32 60/274 |
| 2002/0043243 | A1 | * | 4/2002 | Majima | F02D 13/0219 123/90.15 |
| 2002/0174648 | A1 | | 11/2002 | Minami | |
| 2003/0164163 | A1 | * | 9/2003 | Lei | F02M 26/01 60/602 |
| 2004/0129238 | A1 | * | 7/2004 | Nishida | F02D 13/0215 123/90.11 |
| 2004/0168658 | A1 | * | 9/2004 | Sakai | F01L 1/267 123/90.15 |
| 2004/0221831 | A1 | * | 11/2004 | Chmela | F02D 41/0007 123/301 |
| 2004/0250802 | A1 | * | 12/2004 | Yang | F02D 13/0261 123/568.14 |
| 2005/0000499 | A1 | * | 1/2005 | Ruggiero | F01L 1/08 123/90.12 |
| 2005/0076890 | A1 | * | 4/2005 | Seitz | F02D 13/0226 123/90.15 |
| 2005/0081836 | A1 | * | 4/2005 | Winsor | F02M 35/10157 123/568.14 |
| 2006/0102158 | A1 | * | 5/2006 | Cairns | F02D 41/0002 123/90.15 |
| 2008/0121210 | A1 | * | 5/2008 | Guezet | F02D 13/0207 123/347 |
| 2009/0194080 | A1 | * | 8/2009 | Bression | F02D 13/0226 123/90.15 |
| 2010/0010728 | A1 | * | 1/2010 | Stein | F02M 26/07 60/624 |
| 2011/0000470 | A1 | * | 1/2011 | Roth | F02M 26/07 123/90.15 |
| 2011/0247584 | A1 | * | 10/2011 | Gentile | F02M 69/042 123/294 |
| 2013/0230434 | A1 | * | 9/2013 | Esmond | F01N 3/2885 422/168 |
| 2019/0085775 | A1 | * | 3/2019 | Won | F02D 41/18 |

FOREIGN PATENT DOCUMENTS

| | | | |
|---|---|---|---|
| CN | 104481742 A | 4/2015 | |
| DE | 102013004800 A1 | 9/2014 | |
| EP | 1054143 A2 | 11/2000 | |
| EP | 2154352 A2 | 2/2010 | |
| EP | 2570634 B1 | 11/2014 | |
| EP | 2848783 A1 | 3/2015 | |
| JP | 2002256908 A | 9/2002 | |
| JP | 2002256908 A * | 9/2002 | ......... F02D 13/0219 |
| JP | 2017141750 A * | 8/2017 | ............ F02M 26/08 |
| JP | 2017141750 A | 8/2017 | |
| WO | WO-02057609 A1 * | 7/2002 | ............. F01L 1/053 |
| WO | WO-2008013157 A1 * | 1/2008 | ............. F02M 26/08 |
| WO | WO-2018096586 A1 * | 5/2018 | |

OTHER PUBLICATIONS

PCT Search Report and Written Opinion issued in PCT/EP2019/073794 dated Dec. 11, 2019.

Notification of the First Office Action issued in Chinese Patent Application No. 201980059874.5 dated Nov. 3, 2022, with English translation.

\* cited by examiner

METHOD FOR OPERATING AN INTERNAL COMBUSTION ENGINE

BACKGROUND

Technical Field

The present disclosure relates to a method for operating an internal combustion engine.

Description of Related Art

In order to raise the nitrogen oxide conversion rates of an SCR catalytic converter, especially under low load of an internal combustion engine, it may be necessary, for example, to increase an exhaust gas temperature.

In conventional practice, the residual gas rate at low load can be influenced by way of the valve overlap. However, this results in an increase in the depth of the valve pockets in the piston, which, in turn, is relevant for consumption.

To carry out internal exhaust gas recirculation into the combustion chamber of a diesel internal combustion engine, AT 005 783 U1 discloses that the inlet valve is opened briefly during the exhaust stroke. In order to achieve an improvement in emissions in the low engine speed range, on the one hand, and in the medium and high engine speed range, on the other, it is envisaged that the start of the preliminary lift of the inlet valve occurs in the region of 180° to 210° of crank angle after the TDC position of the ignition.

US 2009/0194080 A1 relates to a method for scavenging residual combustion gas of an internal combustion engine with direct injection, in particular a diesel engine. When the engine is running at low speeds and under high load conditions, at least one sequence of opening/closing of inlet valves is performed during a sequence of opening/closing of exhaust valves in the exhaust phase of the engine in order to achieve scavenging of the residual burnt gas.

SUMMARY

It is the underlying object of the present disclosure to provide a method in which the exhaust gas temperature can be raised under low load.

The object is achieved by the features of independent claim 1. Advantageous developments are indicated in the dependent claims and the description.

The present disclosure relates to a method for operating an internal combustion engine (e.g. a four-stroke internal combustion engine and/or multi-cylinder internal combustion engine).

The method comprises producing a pressure pulse (e.g. a significant and/or sudden and/or time-limited and/or one-time pressure increase, e.g. a pressure pulsation, e.g. a cyclical pressure pulsation) in an exhaust line of the internal combustion engine. The method comprises feeding exhaust gas (e.g. residual exhaust gas) from a combustion chamber of a cylinder into an inlet passage of the cylinder during an exhaust stroke of the cylinder by means of propagation of the pressure pulse from the exhaust line into the combustion chamber of the cylinder. The method comprises feeding the exhaust gas from the inlet passage of the cylinder into the combustion chamber of the cylinder during an inlet stroke of the cylinder.

The method makes it possible to raise the exhaust gas temperature at low load by means of internal residual gas control (residual exhaust gas control) without negatively affecting the full-load performance of the internal combustion engine. The possible nitrogen oxide conversion rates of an SCR catalytic converter increase as a result. The method uses the pressure pulsations in the exhaust line to deliver residual gas from the combustion chamber into an inlet tract of the internal combustion engine. The residual gas is then flushed back into the combustion chamber of the cylinder in the inlet stroke, thereby reducing the fresh air mass in the combustion chamber of the cylinder by the mass of the residual gas. Owing to the reduced air and thus also exhaust gas mass flow, the exhaust gas temperature rises while the engine torque remains constant without negatively affecting the charge exchange work of the engine.

In one exemplary embodiment, the pressure pulse in the exhaust line is produced by opening an exhaust valve of another cylinder of the internal combustion engine during an exhaust stroke of the other cylinder.

In another exemplary embodiment, the other cylinder is operated with a phase offset with respect to the cylinder, preferably with a phase offset of approximately −120° of crank angle (e.g. in the case of a six-cylinder internal combustion engine) and/or of −720° of crank angle/number of cylinders of the internal combustion engine.

The pressure pulse can expediently be passed via an exhaust turbine, for example, e.g. from an exhaust manifold, via the exhaust turbine to another exhaust manifold.

For example, the exhaust line can be of single-flow configuration, i.e. with one exhaust manifold, or of multi-flow configuration, i.e. with a plurality of exhaust manifolds.

In one embodiment, the feeding of exhaust gas from the combustion chamber of the cylinder is brought about only by an increase in a cylinder pressure in the combustion chamber of the cylinder by means of the pressure pulse. The cylinder pressure can preferably be increased by means of a charging pressure in the inlet passage of the cylinder and/or of the internal combustion engine.

In another embodiment, the pressure pulse propagates from the exhaust line into the combustion chamber of the cylinder through an (e.g. already) opened exhaust valve of the cylinder, preferably during an exhaust stroke of the cylinder.

In one variant embodiment, the feeding of exhaust gas from the combustion chamber of the cylinder into the inlet passage of the cylinder by means of the pressure pulse is accomplished by opening an inlet valve of the cylinder preferably during an exhaust stroke of the cylinder and/or during the pressure pulse.

In another variant embodiment, the feeding of the exhaust gas from the inlet passage of the cylinder into the combustion chamber of the cylinder is carried out during an inlet stroke of the cylinder by opening an inlet valve of the cylinder.

In one exemplary embodiment, the inlet valve of the cylinder opens only when the pressure pulse propagates into the combustion chamber of the cylinder. Alternatively or in addition, the inlet valve of the cylinder opens only when the cylinder pressure in the combustion chamber of the cylinder is increased by the pressure pulse above a charging pressure in the inlet passage of the cylinder and/or of the internal combustion engine.

In another exemplary embodiment, the inlet valve of the cylinder closes when or before the cylinder pressure in the combustion chamber of the cylinder once again falls below a charging pressure in the inlet passage of the cylinder and/or of the internal combustion engine.

In one embodiment, the inlet valve of the cylinder opens at the beginning of the exhaust stroke of the other cylinder, and/or the inlet valve of the cylinder opens when the exhaust valve of the other cylinder opens. Alternatively or in addition, the inlet valve of the cylinder opens in the exhaust stroke of the cylinder and/or closes before the end of the exhaust stroke of the cylinder.

In another embodiment, the inlet valve of the cylinder is open in a range of between 100° of crank angle after BDC (bottom dead center of a piston movement of a piston associated with the cylinder) in the power stroke of the cylinder and 150° of crank angle after BDC (bottom dead center of the piston movement of the piston associated with the cylinder) in the exhaust stroke of the cylinder.

In one variant embodiment, the inlet valve of the cylinder opens at approximately or after 100° of crank angle after BDC (bottom dead center of a piston movement of a piston associated with the cylinder) in the exhaust stroke of the cylinder and/or the inlet valve of the cylinder closes at approximately or before 150° of crank angle after BDC (bottom dead center of a piston movement of a piston associated with the cylinder) in the exhaust stroke of the cylinder.

In another variant embodiment, the inlet valve of the cylinder is open for approximately or less than 50° of crank angle in the exhaust stroke of the cylinder.

In one exemplary embodiment, a maximum lift of the inlet valve of the cylinder during the exhaust stroke of the cylinder is less than a maximum lift of the inlet valve of the cylinder during an inlet stroke of the cylinder.

In another exemplary embodiment, a maximum lift of the inlet valve of the cylinder during the exhaust stroke of the cylinder is less than ⅓ or less than ¼ of a maximum lift of the inlet valve of the cylinder during an inlet stroke of the cylinder.

In another exemplary embodiment, a maximum lift of the inlet valve of the cylinder during the exhaust stroke of the cylinder is less than 3 mm, preferably between 1 mm and 2 mm. For example, a maximum lift of the inlet valve of the cylinder during the inlet stroke of the cylinder can be around 10 mm.

In one embodiment, a valve timing curve of the inlet valve of the cylinder is invariable, and/or a valve timing curve of the inlet valve of the cylinder is implemented by a non-switchable and/or rigid cam of a camshaft of the internal combustion engine.

In another embodiment, an actuating device, preferably a valve gear, for actuating the inlet valve of the cylinder is rigid and/or non-switchable. Alternatively or in addition, a valve timing curve of the inlet valve of the cylinder is under low load of the internal combustion engine and under medium load and/or under full load of the internal combustion engine.

In one variant embodiment, the method furthermore comprises operating the internal combustion engine under low load while the pressure pulse is being produced, exhaust gas is being fed from the combustion chamber, and/or the exhaust gas is being fed from the inlet passage.

In another variant embodiment, the method furthermore comprises operating the internal combustion engine in a range of up to 30% to 35% and/or up to 40% of load (partial load or % of a rated load of the internal combustion engine) and/or in a low-speed range, preferably between 800 rpm and 1400 rpm, while the pressure pulse is being produced, exhaust gas is being fed from the combustion chamber, and/or the exhaust gas is being fed from the inlet passage.

In one exemplary embodiment, the method is carried out to increase an exhaust gas temperature in the exhaust line, preferably under low load of the internal combustion engine, preferably to increase a conversion rate of an SCR catalytic converter in the exhaust line.

In another exemplary embodiment, the internal combustion engine comprises a plurality of cylinders (e.g. 4, 6, 8, 10, 12 or more) and the method is used for each cylinder of the internal combustion engine.

The present disclosure also relates to an internal combustion engine or to a commercial vehicle (e.g. a bus or heavy goods vehicle) having an internal combustion engine designed to carry out a method as herein.

It is also possible to use the method as disclosed herein for passenger vehicles, large engines, off-road vehicles, stationary engines, marine engines etc.

BRIEF DESCRIPTION OF THE DRAWINGS

The preferred embodiments and features of the present disclosure which are described above can be combined in any desired way. Further details and advantages of the present disclosure are described below with reference to the appended drawings, in which.

DETAILED DESCRIPTION

The embodiments shown in the figures partially coincide, and therefore similar or identical parts are provided with the same reference signs and attention is also drawn, for the explanation thereof, to the description of the other embodiments or figures in order to avoid repetition.

Figure 1:
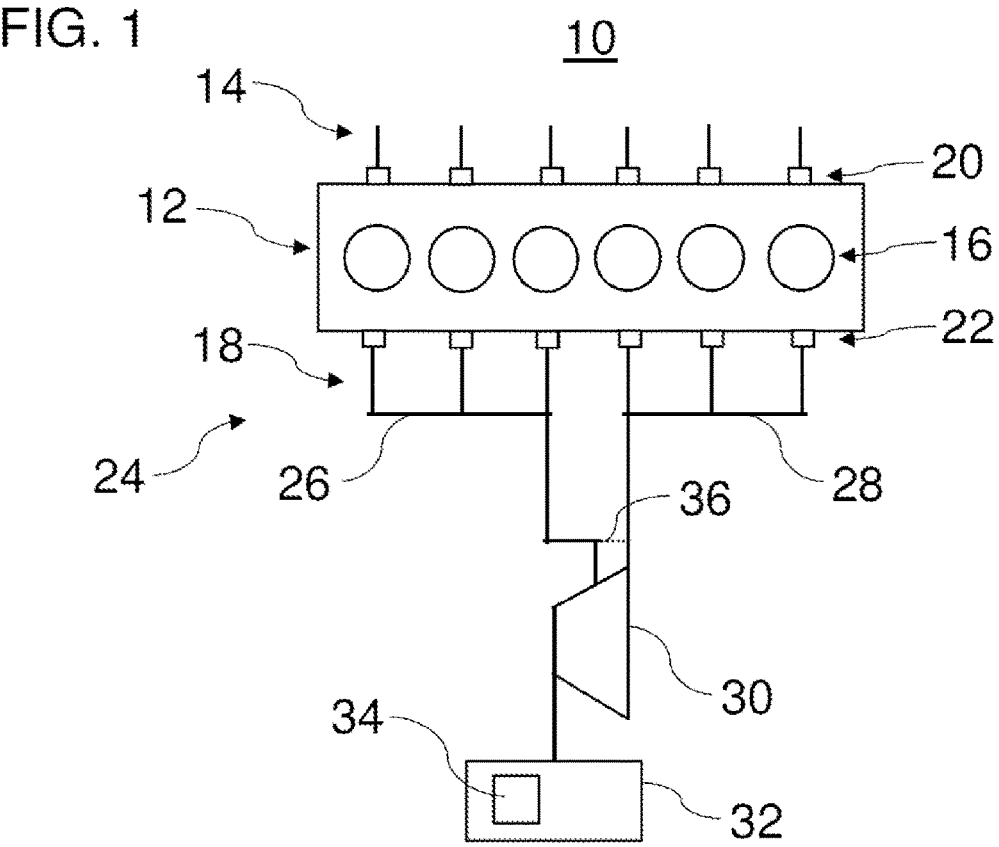
FIG. 1 shows a schematic internal combustion engine suitable for carrying out a method in accordance with the present disclosure.

FIG. 1 shows an internal combustion engine 10. The internal combustion engine 10 is embodied as a multi-cylinder internal combustion engine, preferably as a six-cylinder in-line engine. However, it is also possible for the internal combustion engine to have more or fewer cylinders and/or a different arrangement of cylinders. The internal combustion engine 10 is preferably designed as a four-stroke internal combustion engine. The internal combustion engine 10 can preferably be designed as a diesel internal combustion engine. The internal combustion engine 10 can expediently be included in a motor vehicle, preferably a commercial vehicle (e.g. a heavy goods vehicle or bus).

The illustrative internal combustion engine 10 has a first to sixth cylinder 12. The cylinders 12 are operated with a phase offset of 120° of crank angle relative to one another. The fifth cylinder of the plurality of cylinders 12 can have a phase offset of −120° of crank angle with respect to the first cylinder of the plurality of cylinders 12, for example, etc. While the exhaust stroke is beginning in the fifth cylinder of the cylinders 12, for example, the first cylinder of the plurality of cylinders 12 is already in the middle of the exhaust stroke. If the internal combustion engine 10 has a different number of cylinders, the cylinders accordingly have different phase offsets relative to one another, e.g. −720° of crank angle/number of cylinders.

The cylinders 12 each have at least one inlet passage 14, a combustion chamber 16 and at least one exhaust passage 18. The inlet passages 14 and the exhaust passages 16 can be arranged in a cylinder head of the internal combustion engine 10, for example. Via the inlet passages 16, charge air, for example, can be fed to the combustion chambers 16. Via the exhaust passages 18, exhaust gas can be discharged from the combustion chambers 16.

The cylinders 12 furthermore each have at least one inlet valve 20 and at least one exhaust valve 22, preferably each having two inlet valves 20 and two exhaust valves 22 per cylinder 12. By means of the inlet valves 20, a fluid connection can be established between the inlet passages 14 and the respective combustion chambers 16 of the cylinders 12. By means of the exhaust valves 22, a fluid connection can be established between the combustion chambers 16 and the respective exhaust passages. The inlet valves 20 and exhaust valves 22 can be arranged in a cylinder head of the internal combustion engine 10. The inlet valves 20 and the exhaust valves 22 can be designed as poppet valves, for example.

The internal combustion engine 10 has an exhaust line 24. The exhaust line 24 is of double-flow design, for example, as illustrated, with a first exhaust manifold 26 and a second exhaust manifold 28. The first exhaust manifold 26 connects the exhaust passages 18 of the first three cylinders of the plurality of cylinders 12 to an exhaust turbine 30 of an exhaust turbocharger. The first exhaust manifold 26 carries exhaust gas out of the first three cylinders of the plurality of cylinders 12 to the exhaust turbine 30. The second exhaust manifold 28 connects the other three cylinders of the plurality of cylinders 12 to the exhaust turbine 30 in order to feed exhaust gas to the exhaust turbine 30. The exhaust line 24 can also have more or fewer exhaust gas flows or exhaust manifolds.

It is possible, in particular, for each of those cylinders of the plurality of cylinders 12, the exhaust passages 18 of which are connected directly to a common exhaust manifold 26 or 28, to be operated with a phase offset of 240° of crank angle.

An exhaust gas aftertreatment device 32 can be arranged downstream of the exhaust turbine 30. In particular, the exhaust gas aftertreatment device 32 can have a device for selective catalytic reduction of nitrogen oxides in the exhaust gas or an SCR catalytic converter device (SCR=selective catalytic reduction) 34. A nitrogen oxide conversion rate of the SCR catalytic converter device 34 may be temperature-dependent. Particularly at low exhaust gas temperatures, e.g. when starting the engine or during low-load operation of the internal combustion engine 10, an exhaust gas temperature may be too low for a desired nitrogen oxide conversion rate.

The method disclosed herein and an internal combustion engine which carries out the method disclosed herein are capable of raising an exhaust gas temperature during low-load operation by using a pressure pulse in the exhaust line and by means of a double inlet valve lift.

Figure 2:
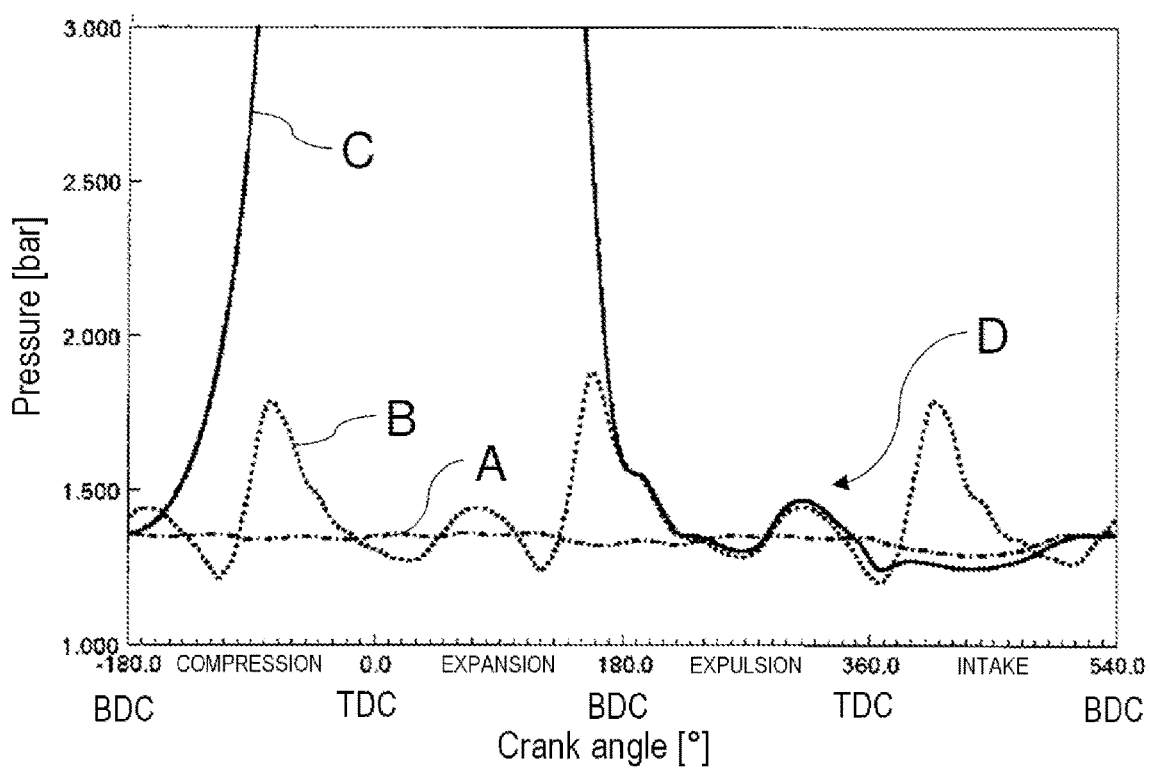
FIG. 2 shows a diagram which shows various pressure values against a crank angle of an internal combustion engine.

FIG. 2 shows different pressure characteristics during a power stroke of the internal combustion engine 10 with reference to one of the plurality of cylinders 12 (the "cylinder 12 under consideration") for a low-load operating point.

The chain-dotted curve A corresponds to an illustrative pressure characteristic in the inlet passage 14 of the cylinder 12 under consideration. The dotted curve B corresponds to an illustrative pressure characteristic in the respective exhaust passage 18 of the cylinder 12 under consideration. The solid curve C corresponds to an illustrative pressure characteristic of a cylinder pressure in the combustion chamber 16 of the cylinder 12 under consideration.

Curve A shows that the pressure in the inlet passage 14 of the cylinder 12 under consideration is substantially constant. The pressure falls slightly when the inlet valve 20 of the cylinder 12 under consideration is open in the intake stroke or the inlet stroke. In the intake stroke, charge air flows into the combustion chamber 16 of the cylinder 12 under consideration. During the other strokes, the pressure in the inlet passage 14 is substantially constant, with slight fluctuations, which are caused, for example, by the opening and closing of other inlet valves 20 of other cylinders 12. For example, the pressure in the inlet passage 14 may be between 1.3 bar and 1.4 bar when the internal combustion engine 10 is operated under low load, as illustrated by way of example.

Curve B shows that a pressure in the exhaust passage 18 of the cylinder 12 under consideration fluctuates quite severely during a cycle. When the exhaust valve 22 of the cylinder 12 under consideration is opened at the end of the expansion stroke, the pressure rises sharply and is gradually dissipated in accordance with a cylinder pressure characteristic C in this region. In addition, there are further pressure pulsations in the exhaust passage 18 of the cylinder 12 under consideration, to be specific every 120° of crank angle. The pressure positions are caused by the opening of the exhaust valves 22 of the other cylinders 12. In the example illustrated, the high pressure pulses during the compression stroke and the intake stroke are caused by those cylinders 12 which are connected to the same exhaust manifold 26 or 28 as the cylinder 12 under consideration. The lower pressure pulses during the expansion stroke, the expulsion stroke and at the end of the intake stroke and into the compression stroke are caused by those cylinders 12 which are connected to the other exhaust manifold 26 or 28 from the cylinder 12 under consideration. The transmission of the lower pressure pulses takes place by way of a connection of the exhaust manifolds 26 and 28 by the exhaust turbine 30. This connection is indicated in a purely schematic way by a dotted line in FIG. 1 and is provided with the reference sign 36.

Curve C shows that a cylinder pressure during the expansion stroke is greatly increased. In addition, it is illustrated in region D that the cylinder pressure in the second half of the expulsion stroke (exhaust stroke) is even higher. The reason for the increase lies in the effect of the pressure pulse in the exhaust passage 18 of the cylinder 12 under consideration (see curve B). This pressure pulse is caused by the opening of the exhaust valve 22 of a cylinder of the plurality of cylinders 12 which is being operated with a phase offset of −120° of crank angle. During this period of time, this cylinder operated with a phase offset of −120° of crank angle begins its exhaust stroke at the beginning of the period of time, the exhaust gas being expelled through the opened exhaust valve 22 during this stroke.

It has been recognized that the cylinder pressure increase caused in the cylinder 12 under consideration by the pressure pulse in the exhaust line 24 can have an effect such that, owing to the pressure pulse (curve B), the cylinder pressure (curve C) rises higher than the charge air pressure (curve A). In the exemplary embodiment with the six-cylinder internal combustion engine, the cylinder pressure of the cylinder 12 under consideration during the expulsion stroke is higher than the charging pressure in a region of about 280° of crank angle and 330° of crank angle.

This insight can be used, exploiting the effect of the pressure pulse, to deliver residual gas from the combustion chamber 16 of the cylinder 12 under consideration into the inlet passage 14 of the cylinder 12 under consideration. It is proposed to open the inlet valve 20 of the cylinder 12 under consideration during this phase, in the exhaust stroke, in addition to the standard inlet lift during the intake stroke, as additionally illustrated in FIG. 3.

Figure 3:
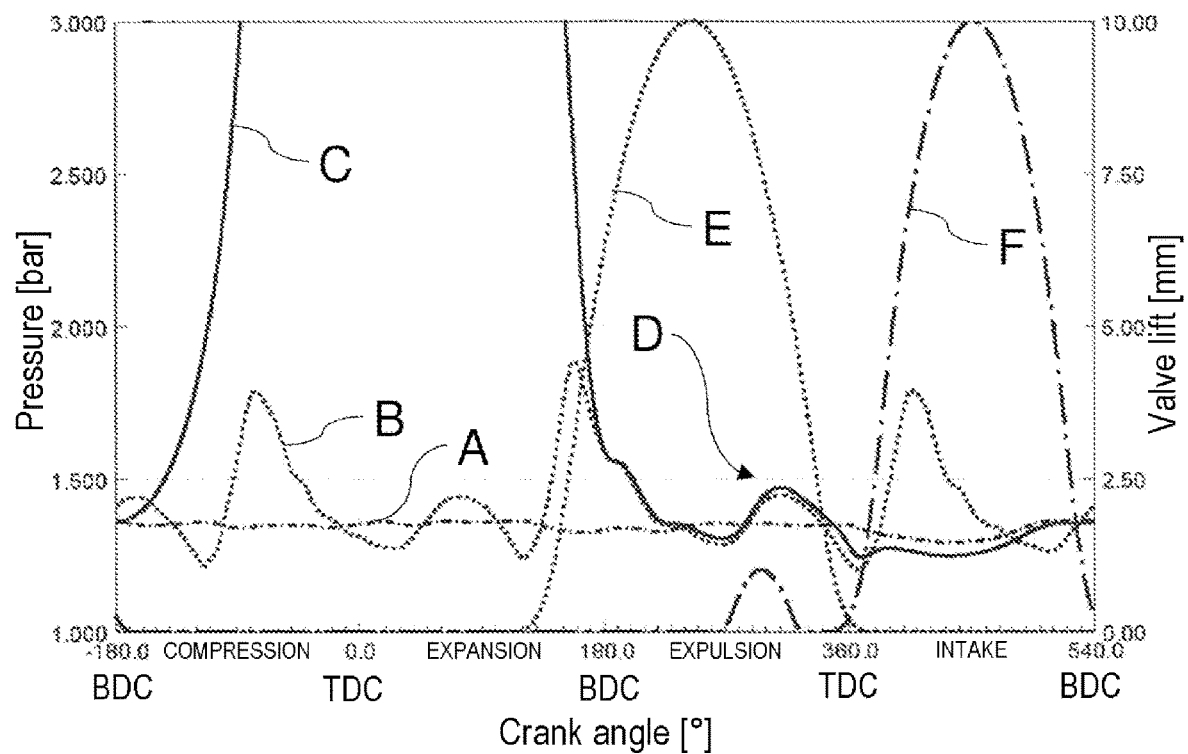
FIG. 3 shows a diagram which shows various pressure values and valve timing curves against a crank angle of an internal combustion engine in accordance with the present disclosure.

In addition to the curves of FIG. 2, FIG. 3 additionally shows a valve timing curve of the exhaust valve 22 of the cylinder 12 under consideration as a dotted curve E and a valve timing curve of the inlet valve 20 of the cylinder 12 under consideration as a chain-dotted curve F.

Curve E shows that the exhaust valve 22 of the cylinder 12 under consideration is opened during the exhaust stroke.

Curve 11 shows that the inlet valve 20 of the cylinder 12 under consideration performs a double lift. The inlet valve 20 opens a first time in the exhaust stroke, more specifically precisely while the pressure pulse is increasing the cylinder pressure in the combustion chamber 16 of the cylinder 12 under consideration by way of the charging pressure in the inlet passage 14. Residual gas then flows through the opened inlet valve 20 into the inlet passage 14 of the cylinder 12 under consideration. The inlet valve 20 of the cylinder 12 under consideration then closes before the cylinder pressure in the combustion chamber 16 of the cylinder under consideration falls back below the charging pressure. The inlet valve 20 of the cylinder 12 under consideration then opens again normally in the intake stroke. In the intake stroke, residual gas is flushed back out of the inlet passage 14 into the combustion chamber 16 of the cylinder 21 under consideration. At the same time, the fresh air mass in the combustion chamber 16 of the cylinder 12 under consideration is reduced by the mass of the residual gas. Owing to the reduced air and thus also exhaust gas mass flow, the exhaust gas temperature rises while the engine torque remains constant without negatively affecting the charge exchange work of the engine. The scavenging of the residual gas can be used to bring about an exhaust gas temperature increase in the exhaust line 24 under a low load of the internal combustion engine 10 in order to increase a nitrogen oxide conversion rate of the SCR catalytic converter device 34.

The residual gas quantity in the low-load range can be preset by way of the lift length and lift height of the inlet valve 20 during the exhaust stroke. It is possible that the additional lift of the inlet valve 20 will have an effect on the maximum possible rated power of the internal combustion engine. Standard engines generally have a significantly negative scavenging gradient at rated power, i.e. the exhaust gas backpressure is significantly higher than the charging pressure. This leads to increased residual gas rates even at rated power. The lift size and lift length of the additional lift of the inlet valve 20 must therefore be correctly designed in order to avoid reducing the rated power.

In respect of the lift length, the proposal for the illustrative six-cylinder internal combustion engine 10 is that the inlet valve 20 of the cylinder 12 under consideration is open in a range between 100° of crank angle after BDC in the exhaust stroke of the cylinder 12 under consideration and 150° of crank angle after BDC in the exhaust stroke of the cylinder 12 under consideration.

In respect of a maximum lift of the inlet valve 20 of the cylinder 12 under consideration, it is proposed that this lift should be less than ⅓ during the exhaust stroke of the cylinder 12 under consideration or less than ¼ of a maximum lift of the inlet valve 20 of the cylinder 12 under consideration during an inlet stroke of the cylinder 12 under consideration, e.g. around 1 mm to 2 mm, as illustrated.

The orientation, length and height of the additional lift has thus been configured in such a way that as much residual gas as possible is scavenged into the inlet passage 14 in the low-load range, and there is only a small change toward "normal" timings at higher engine loads in the main driving range.

The advantageous configuration of the additional lift at the inlet valve 20 in the exhaust stroke ensures that the additional lift can be carried out both under partial load and under full load without having a significantly negative effect under full load. Thus, there is no need to provide a switchable system for selective activation of the additional lift of the inlet valve 20. Instead, it is sufficient if the inlet valve 20 is actuated by a robust, rigid, non-switchable cam of a camshaft or, more generally, by way of a rigid, non-switchable valve gear which brings about the same valve timing curve for all the load ranges. Thus, the valve timing curve of the inlet valve 20 under low load of the internal combustion engine 10 is identical to that under medium load and under full load of the internal combustion engine 10.

Figure 4:
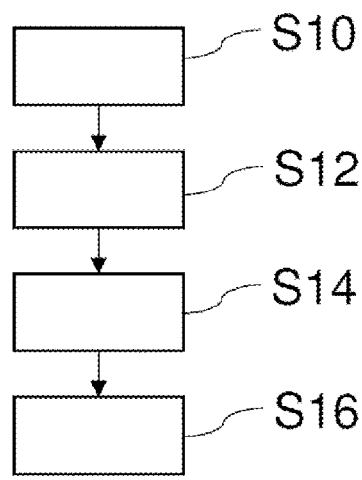
FIG. 4 shows a schematic flow diagram of an illustrative method in accordance with the present disclosure.

A method for operating an internal combustion engine for increasing an exhaust gas temperature has been derived from the above principle of exploiting the pressure pulsations in the exhaust line 24 of the internal combustion engine 10, said method being described below in a greatly simplified way with reference to FIG. 4 in conjunction with FIGS. 1 to 3.

In a method step S10, a pressure pulse is produced in the exhaust line 24 of the internal combustion engine 10. For example, the pressure pulse can be brought about in the exhaust line 24 by opening the exhaust valve 22 of one of the plurality of cylinders 12 during an exhaust stroke of said cylinder, as is described with reference to FIGS. 2 and 3. In the context of the teaching of the present disclosure, however, it is possible to exploit any other pressure pulse in the exhaust line 24 and/or to produce a pressure pulse in some other way.

In a method step S12, the pressure pulse propagates in the exhaust line 24. The pressure pulse penetrates through an exhaust valve 22, already opened in the exhaust stroke, of one of the plurality of cylinders 12, into the combustion chamber 16 thereof, and increases the cylinder pressure there. The cylinder pressure is increased by way of the charging pressure in the inlet passage 14 of the same cylinder 12 (see region D in FIGS. 2 and 3).

In a method step S14, exhaust gas or residual gas is fed from the combustion chamber 16 into the inlet passage 14. The feeding is made possible by the additional lift of the inlet valve 20 of the cylinder during the exhaust stroke (see FIG. 3). The inlet valve 20 is opened only after the cylinder pressure has been increased by way of the charging pressure. The inlet valve 20 is closed before the cylinder pressure falls below the charging pressure.

In a method step S16, the exhaust gas is flushed back out of the inlet passage 14 into the combustion chamber of the cylinder 12 during the inlet stroke. As explained above, an exhaust gas temperature can thereby be increased under low load in order to increase a nitrogen oxide conversion rate of the SCR catalytic converter device.

Even if the method has been described only for one of the cylinders 12, it can in principle be used for any of the plurality of cylinders 12. A different cylinder, which is operated with a phase offset, then brings about the pressure pulse in the exhaust line 24, for example.

The present disclosure is not restricted to the preferred exemplary embodiments described above. On the contrary, a large number of variants and modifications that likewise make use of the inventive concept and therefore fall within the scope of protection is possible. In particular, the present disclosure also claims protection for the subject matter and the features of the dependent claims independently of the claims to which reference is made. In particular, the features of independent claim 1 are disclosed independently of one another. In addition, the features of the dependent claims are also disclosed independently of all the features of independent claim 1. All range data herein should be interpreted as disclosed in such a way that, as it were, all the values which fall within the respective range are disclosed individually, e.g. also as respective preferred outer limits of the respective range.

LIST OF REFERENCE SIGNS

10 internal combustion engine
12 cylinder
14 inlet passages
16 combustion chambers
18 exhaust passages
20 inlet valves
22 exhaust valves
24 exhaust line
26 first exhaust manifold
28 second exhaust manifold
30 exhaust turbine
32 exhaust gas aftertreatment device
34 SCR catalytic converter device
36 connection
A-C pressure characteristics
D pressure pulse
E-F valve timing curves

What is claimed is:

1. A method for operating an internal combustion engine, comprising:
 producing a pressure pulse in an exhaust line of the internal combustion engine;
 feeding exhaust gas from a combustion chamber of a cylinder into an inlet passage of the cylinder during an exhaust stroke of the cylinder by means of propagation of the pressure pulse from the exhaust line into the combustion chamber of the cylinder; and
 feeding the exhaust gas from the inlet passage of the cylinder into the combustion chamber of the cylinder during an inlet stroke of the cylinder; and
 one or more of:
 operating the internal combustion engine in a range of up to 40% of load, while the pressure pulse is being produced, exhaust gas is being fed from the combustion chamber, and the exhaust gas is being fed from the inlet passage; or
 operating the internal combustion engine between 800 rpm and 1400 rpm, while the pressure pulse is being produced, exhaust gas is being fed from the combustion chamber, and the exhaust gas is being fed from the inlet passage
 wherein:
 a valve timing curve of the inlet valve of the cylinder is invariable; and/or
 a valve timing curve of the inlet valve of the cylinder is implemented by a non-switchable and/or rigid cam of a camshaft of the internal combustion engine, and/or an actuating device for actuating the inlet valve of the cylinder is rigid and/or non-switchable.

2. The method as claimed in claim 1, wherein:
 the pressure pulse in the exhaust line is produced by opening an exhaust valve of another cylinder of the internal combustion engine during an exhaust stroke of the another cylinder.

3. The method as claimed in claim 2, wherein:
 the another cylinder is operated with a phase offset with respect to the cylinder.

4. The method as claimed in claim 2, wherein:
 the phase offset is approximately −120° of crank angle and/or −720° of crank angle/number of cylinders of the internal combustion engine.

5. The method as claimed in claim 1, wherein:
 the feeding of exhaust gas from the combustion chamber of the cylinder is brought about only by an increase in a cylinder pressure in the combustion chamber of the cylinder by means of the pressure pulse.

6. The method as claimed in claim 5, wherein:
 the increase is above a charging pressure in the inlet passage of the cylinder and/or of the internal combustion engine.

7. The method as claimed in claim 1, wherein:
 the pressure pulse propagates from the exhaust line into the combustion chamber of the cylinder through an opened exhaust valve of the cylinder.

8. The method as claimed in claim 7, wherein:
 the pressure pulse propagates during an exhaust stroke of the cylinder.

9. The A method as claimed in claim 1, wherein:
 the feeding of exhaust gas from the combustion chamber of the cylinder into the inlet passage of the cylinder by means of the pressure pulse is accomplished by opening an inlet valve of the cylinder during an exhaust stroke of the cylinder and/or during the pressure pulse; and/or
 the feeding of the exhaust gas from the inlet passage of the cylinder into the combustion chamber of the cylinder is carried out during an inlet stroke of the cylinder by opening an inlet valve of the cylinder;
 and wherein
 the inlet valve of the cylinder opens at approximately or after 100° of crank angle after BDC in the exhaust stroke of the cylinder; and/or
 the inlet valve of the cylinder is open for approximately or less than 50° of crank angle in the exhaust stroke of the cylinder.

10. The method as claimed in claim 9, wherein:
 the inlet valve of the cylinder opens only when the pressure pulse propagates into the combustion chamber of the cylinder; and/or
 the inlet valve of the cylinder opens only when the cylinder pressure in the combustion chamber of the cylinder has been increased by the pressure pulse above a charging pressure in the inlet passage of the cylinder and/or of the internal combustion engine; and/or
 the inlet valve of the cylinder closes when or before the cylinder pressure in the combustion chamber of the cylinder once again falls below a charging pressure in the inlet passage of the cylinder and/or of the internal combustion engine.

11. The method as claimed in claim 9, wherein:
 the inlet valve of the cylinder opens at the beginning of the exhaust stroke of the another cylinder; or
 the inlet valve of the cylinder opens when the exhaust valve of the another cylinder opens; or
 the inlet valve of the cylinder opens in the exhaust stroke of the cylinder and closes before the end of the exhaust stroke of the cylinder.

12. The method as claimed in claim 9, wherein:
the inlet valve of the cylinder is open in a range of between 100° of crank angle after BDC in the power stroke of the cylinder and 150° of crank angle after BDC in the exhaust stroke of the cylinder; and/or
the inlet valve of the cylinder closes at approximately or before 150° of crank angle after BDC in the exhaust stroke of the cylinder.

13. The method as claimed in claim 9, wherein:
a maximum lift of the inlet valve of the cylinder during the exhaust stroke of the cylinder is less than a maximum lift of the inlet valve of the cylinder during an inlet stroke of the cylinder; and/or
a maximum lift of the inlet valve of the cylinder during the exhaust stroke of the cylinder is less than $1/3$ or less than $1/4$ of a maximum lift of the inlet valve of the cylinder during an inlet stroke of the cylinder; and/or
a maximum lift of the inlet valve of the cylinder during the exhaust stroke of the cylinder is less than 3 mm.

14. The method as claimed in claim 9, wherein:
a valve timing curve of the inlet valve of the cylinder is under low load of the internal combustion engine and under medium load and/or under full load of the internal combustion engine.

15. The method as claimed in claim 1, wherein:
the method is carried out to increase an exhaust gas temperature in the exhaust line.

16. The method as claimed in claim 15, wherein:
the method is carried out under low load of the internal combustion engine and/or to increase a conversion rate of an SCR catalytic converter device in the exhaust line.

17. The method as claimed in claim 1, wherein:
the internal combustion engine has a plurality of cylinders and the method is used for each cylinder of the internal combustion engine.

18. An internal combustion engine or commercial vehicle having an internal combustion engine which is designed to carry out a method as claimed in claim 1.

19. An internal combustion engine or commercial vehicle having an internal combustion engine which is designed to carry out a method as claimed in claim 9.

* * * * *